US011070751B2

(12) United States Patent
Jang

(10) Patent No.: US 11,070,751 B2
(45) Date of Patent: Jul. 20, 2021

(54) ELECTRONIC DEVICE AND IMAGE UP-SAMPLING METHOD FOR ELECTRONIC DEVICE

(71) Applicant: Samsung Electronics Co., Ltd., Suwon-si (KR)

(72) Inventor: Soongeun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/754,704

(22) PCT Filed: Jul. 26, 2018

(86) PCT No.: PCT/KR2018/008487
§ 371 (c)(1),
(2) Date: Apr. 8, 2020

(87) PCT Pub. No.: WO2019/078458
PCT Pub. Date: Apr. 25, 2019

(65) Prior Publication Data
US 2020/0260023 A1    Aug. 13, 2020

(30) Foreign Application Priority Data
Oct. 20, 2017 (KR) .......................... 10-2017-0136862

(51) Int. Cl.
H04N 5/347 (2011.01)
H04N 5/232 (2006.01)
H04N 5/343 (2011.01)

(52) U.S. Cl.
CPC ......... H04N 5/347 (2013.01); H04N 5/23232 (2013.01); H04N 5/343 (2013.01)

(58) Field of Classification Search
CPC .... H04N 5/23232; H04N 5/343; H04N 5/347; H04N 5/3696; H01L 27/14603–14607
See application file for complete search history.

(56) References Cited

U.S. PATENT DOCUMENTS 10,015,414 B2   7/2018   Kim et al.
10,015,428 B2   7/2018   Lee et al.
(Continued)

FOREIGN PATENT DOCUMENTS

JP   2001-250931 A   9/2001
KR  10-2014-0113923 A   9/2014
(Continued)

OTHER PUBLICATIONS

ISA/KR, International Search Report and Written Opinion of the International Searching Authority, International Application No. PCT/KR2018/008487, dated Nov. 1, 2018, 15 pages.

Primary Examiner — Paul M Berardesca

(57) ABSTRACT

An electronic device according to various embodiments of the present invention comprises an image sensor and a processor, wherein the image sensor comprises a microlens and a light-receiving sensor pixel capable of converting light having passed through the microlens into an electrical signal, the light-receiving sensor pixel comprises a first floating diffusion area and a second floating diffusion area, the light-receiving sensor pixel is set, as a first area and a second area having different sizes, in accordance with the activation of either the first floating diffusion area or the second floating diffusion area, a signal generated by the light-receiving sensor pixel can be classified and read out as a first signal corresponding to the first area and a second signal corresponding to the second area, and the processor can be set so as to: use the image sensor so as to activate the first floating diffusion area, thereby acquiring a first image of an external object; use the image sensor so as to activate the second floating diffusion area, thereby acquiring a second image of the external object; and synthesize at least a portion of the first image and at least a portion of the second image, thereby generating a third image having a resolution higher (Continued)

than that of the first or second image. Additional various embodiments are possible.

15 Claims, 16 Drawing Sheets

(56) References Cited

U.S. PATENT DOCUMENTS

| | | | |
|---|---|---|---|
| 2009/0290059 A1* | 11/2009 | Suzuki | H04N 5/23212 |
| | | | 348/308 |
| 2013/0057744 A1* | 3/2013 | Minagawa | H04N 5/37457 |
| | | | 348/311 |
| 2015/0304582 A1 | 10/2015 | Hirota | |
| 2015/0363913 A1 | 12/2015 | Higgins | |
| 2017/0142325 A1 | 5/2017 | Shimokawa et al. | |

FOREIGN PATENT DOCUMENTS

| | | |
|---|---|---|
| KR | 10-1619480 B1 | 5/2016 |
| KR | 10-2016-0109282 A | 9/2016 |
| KR | 10-2017-0006206 A | 1/2017 |
| KR | 10-2017-0056909 A | 5/2017 |

* cited by examiner

ELECTRONIC DEVICE AND IMAGE UP-SAMPLING METHOD FOR ELECTRONIC DEVICE

CROSS-REFERENCE TO RELATED APPLICATIONS

This application is a 371 National Stage of International Application No. PCT/KR2018/008487, filed Jul. 26, 2018, which claims priority to Korean Patent Application No. 10-2017-0136862, filed Oct. 20, 2017, the disclosures of which are herein incorporated by reference in their entirety.

BACKGROUND

1. Field

The disclosed embodiments relate to an electronic device and, in particular, an image up-sampling method of the electronic device that is capable of acquiring a high-resolution image using a multi-frame-based image sensor.

2. Description of Related Art

An image sensor is a device that generates an analog signal corresponding to incident light sensed by unit pixels and converts an analog signal to a digital signal to generate an image of an external object. In line with the diversification of portable electronic devices (hereinafter, referred to as "electronic devices") such as a smartphone and a tablet personal computer (PC), the image sensor has become common across the electronic devices for implementing various features.

SUMMARY

In order to meet the requirements of users, it is necessary for an electronic device to acquire a high-resolution image with its image sensor. However, the image sensor of the electronic device is limited in size, which limits a number of unit pixels and makes it difficult to acquire a high-resolution optical image. In this respect, various methods for up-sampling an image obtained with the unit pixels have been proposed.

However, the conventional up-sampling methods cannot obtain a high-resolution image without noise.

According to various disclosed embodiments, an electronic device includes an image sensor and a processor, wherein the image sensor includes a micro lens and a light-receiving sensor pixel converting light passed through the micro lens to an electric signal, the light-receiving sensor pixel including a first floating diffusion region and a second floating diffusion region, and is configured to divide the light-receiving sensor pixel into a first area and a second area based on one of the first and second floating diffusion regions being activated, the first and second areas being different in size, and read out signals generated by the light-receiving sensor pixel, the signals including a first signal corresponding to the first area and a second signal corresponding to the second area; and the processor is configured to control the image sensor to activate the first floating diffusion region to acquire a first image of an external object and activate the second floating diffusion region to acquire a second image of the external object and to synthesize at least part of the first image and at least part of the second image to generate a third image having a resolution higher than the resolution of the first image or the second image.

According to various disclosed embodiments, an electronic device includes an image sensor including multiple light-receiving sensor pixels and a processor that is electrically connected to the image sensor, wherein the image sensor includes the light-receiving sensor pixels each including multiple floating diffusion regions of which at least one is divided into multiple areas based on at least one of the multiple floating diffusion regions being activated and is configured to convert light detected in the multiple areas to an electric signal and send the electric signal to the processor; and the processor is configured to control to activate at least one predetermined floating diffusion region at each of predetermined time points to acquire a signal output from each of the light-receiving sensor pixels and generate an up-sampled image based on the signals acquired at multiple time points.

According to various disclosed embodiments, an image up-sampling method of an electronic device includes acquiring a first image of an external object by activating a first floating diffusion region of a light-receiving sensor pixel, acquiring a second image of the external object by activating a second floating diffusion region of the light-receiving sensor pixel, and generating a third image by synthesizing at least part of the first image and at least part of the second image, the third image having a resolution higher than a resolution of the first or second image.

According to various disclosed embodiments, the proposed up-sampling method is advantageous in terms of acquiring a noiseless high-resolution image with a sub-pixel shift.

DETAILED DESCRIPTION

Figure 1:
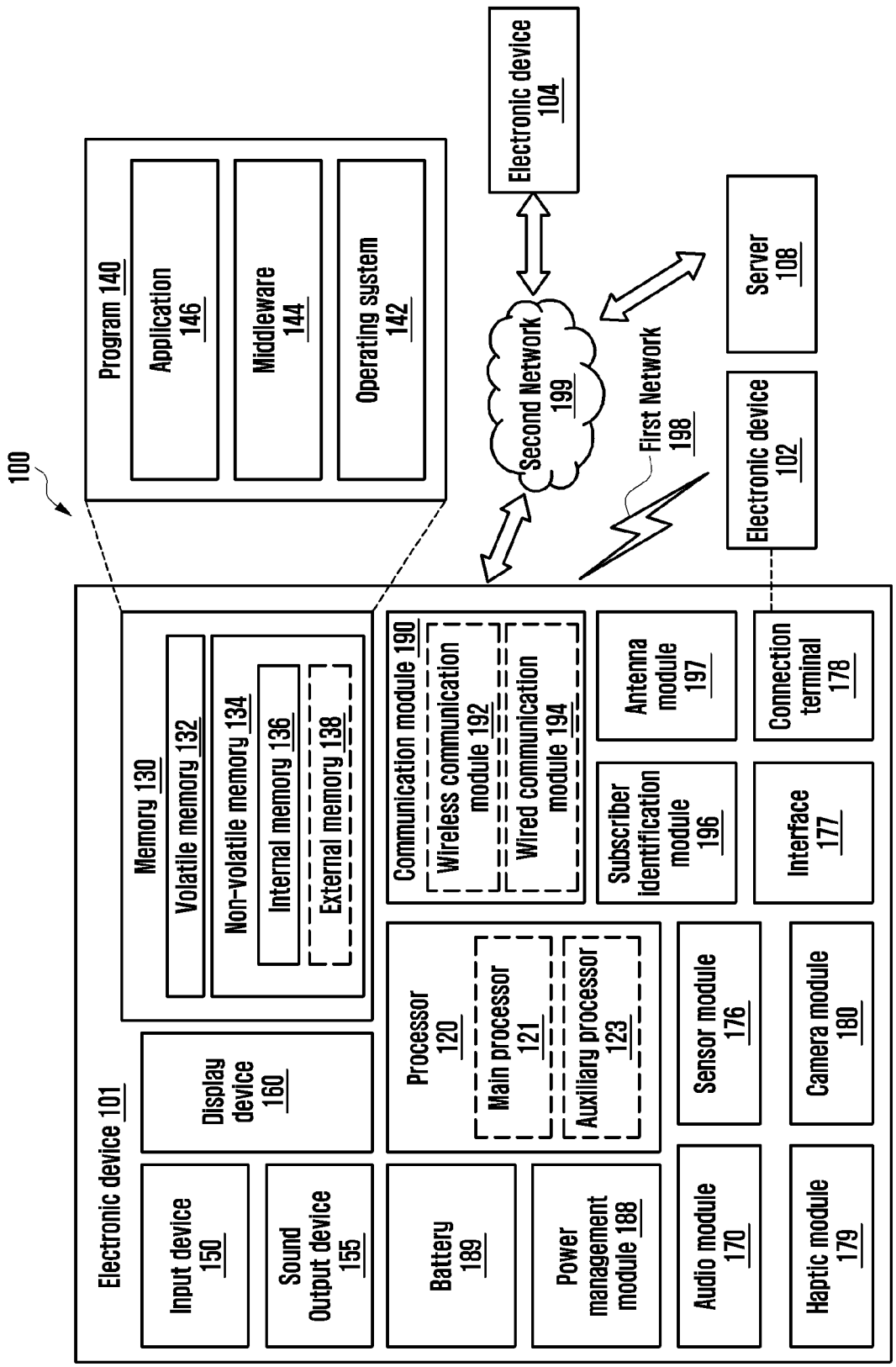
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector)

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
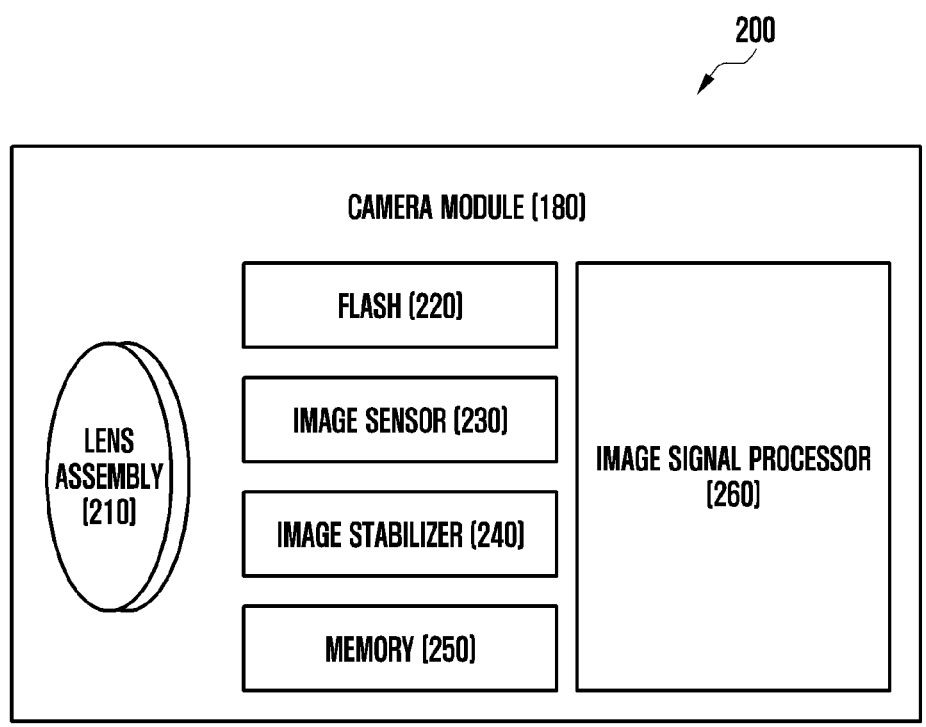
FIG. 2 is a block diagram illustrating a configuration of a camera module according to various embodiments.

FIG. 2 is a block diagram illustrating a configuration of a camera module 200 according to various embodiments. In reference to FIG. 2, the camera module 180 may include a lens assembly 210, a flash 220, an image sensor 230, an image stabilizer 240, a memory 250 (e.g., buffer memory), or an image signal processor 260. The lens assembly 210 may collect light emitted by a subject as a target of which an image is to be taken. The lens assembly 210 may include one or more lenses. According to an embodiment, the camera module 180 may include multiple lens assemblies 210. In this case, the camera module 180 may, by way of example, be a dual camera, a 360-degree camera, or a spherical camera. The multiple lens assemblies 210 may have the same lens characteristics (e.g., view angle, focal distance, autofocus, f-number, or optical zoom), or at least one of the lens assemblies 210 may have lens characteristics different from those of at least one other lens assembly. The lens assembly 210 may, by way of example, include a wide-angle lens or a telephoto lens. The flash 220 may emit light to reinforce the light emitted by the subject. The flash 220 may include one or more diodes (e.g., red-green-blue (RGB) LED, white LED, infrared LED, or ultraviolet LED) or xenon lamps.

The image sensor 230 may convert the light from the subject to an electrical signal to take an image corresponding to the subject. According to an embodiment, the image sensor 230 may include an image sensor selected among image sensors with different characteristics such as an RGB sensor, a black and white (BW) sensor, an IR sensor, or a UV sensor, multiple image sensors with the same characteristics, or multiple image sensors with different characteristics. The individual image sensors included in the image sensor 230 may each be implemented with a charged coupled device (CCD) sensor or a complementary metal oxide semiconductor (CMOS) sensor.

The image stabilizer 240 may move or control (e.g., read-out timing adjustment) at least one lens or the image sensor 230 in a certain direction to compensate for at least partly a negative effect to the image to be taken (e.g., shaking of image) that is caused by any shaking of the camera module 180 or the electronic device 101 including the camera module 180. According to an embodiment, the image stabilizer 240 may, by way of example, be implemented with an optical image stabilizer to detect any motion by means of a gyro sensor (not shown) or an acceleration sensor (not shown) arranged inside or outside the camera module 180.

The memory 250 may temporarily store at least part of images taken by the image sensor 230 for further processing in a next image process. For example, in the case that image capture is time-lapsed according to a shutter speed or multiple images are captured at a high speed, the raw captured images (e.g., high-resolution images) may be stored in the memory 250, and copy images (e.g., low-resolution images) corresponding to the raw images may be previewed on the display device 160. Afterward, at least part of the raw images stored in the memory 250 may be read out and processed by the image signal processor 260 by way of example. According to an embodiment, the memory 250 may be implemented as at least part of the memory 130 or a separate memory operating independently.

The image signal processor 260 may perform an image processing on an image taken by the image sensor 230 or stored in the memory 250 (e.g., depth map creation, 3-dimensional modeling, panorama creation, feature point extraction, image synthesis, or image compensation (e.g., noise canceling, resolution adjustment, brightness adjustment, blurring, sharpening, or softening)). Additionally or alternatively, the image signal processor 260 may control at least one (e.g., image sensor 230) of the components of the camera module 180 (e.g., exposure time control or read-out timing control). The image processed by the image signal processor 260 may be re-stored in the memory 250 for additional processing or transferred to a component (e.g., memory 130, display device 160, electronic device 102, electronic device 104, or server 108) outside the camera module 180. According to an embodiment, the image signal processor 260 may be implemented as part of the processor 120 or as a separate processor operating independently of the processor. In the case of being implemented as a separate processor, the images processed by the image signal processor 260 may be displayed on the display device 160 with or without being further processed.

According to an embodiment, the electronic device 101 may include two or more camera modules 180 with different characteristics or functions. In this case, at least one of the camera modules 180 may be a wide-angle camera or a front camera, and at least one camera may be a telephoto camera or a rear camera.

Figure 3:
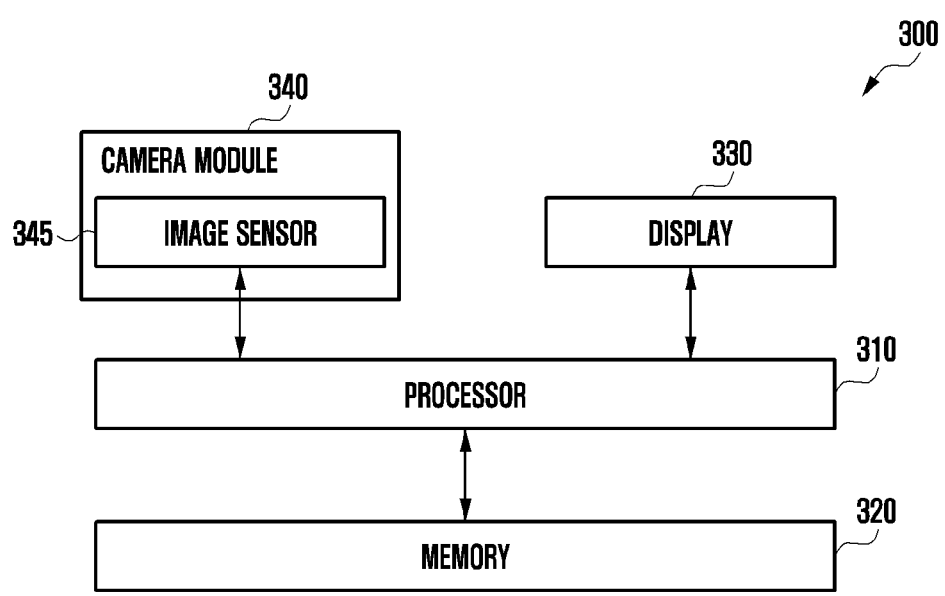
FIG. 3 is a block diagram illustrating a configuration of an electronic device according to various embodiments.

FIG. 3 is a block diagram illustrating a configuration of an electronic device according to various embodiments.

As shown in the drawing, the electronic device 300 may include a camera module 340, a display 330, a processor 310, and a memory 320 of which at least some may be omitted or replaced according to various disclosed embodiments. The electronic device 300 may further include at least part of the components and/or functions of the electronic device 101 of FIG. 1.

According to various embodiments, the memory 320 may include a volatile memory (e.g., volatile memory 132 in FIG. 1) and/or a non-volatile memory (e.g., non-volatile memory 134) and may be electrically connected with the processor 310. The memory 320 may store various instructions executable by the processor 310. The instructions may include control commands for arithmetical and logical operations, data transfer, and input/output. The memory 320 may also store at least part of the program 140 of FIG. 1.

According to various embodiments, the processor 310 is configured to control the components of the electronic device 300 and/or perform communication-related operations and data processing and may include at least part of the configuration and/or functionality of the processor 120 of FIG. 1. The processor 310 may be electrically connected to each component (e.g., memory 320, display 330, camera module 340, and display 330) of the electronic device 300. Although the processor 310 can be implemented without any limitation in operation and data processing functionality in the electronic device 300, the disclosure is directed to the detailed operations of the processor 330 for determining a floating diffusion region of light-receiving sensor pixels and generating a high-resolution image based on a signal acquired from divided light-receiving sensor pixels according to various embodiments. The operations of the processor 310 to be described hereinafter may be performed by loading the instructions stored in the above-described memory 320 (440).

The display 330 is configured to display an image and may be implemented with a liquid crystal display (LCD), a light-emitting diode (LED) display, or an organic LED (OLED) display. The display 330 may include at least part of the configuration and/or functionality of the display device 160 of FIG. 1.

According to various embodiments, the camera module 340 is configured to take an image of an external object and may include at least part of the configuration and/or functionality of the camera module 180 of FIGS. 1 and 2. The camera module 340 includes an image sensor 345, which may include a pixel array (not shown) of light-receiving sensor pixels and a micro lens (not shown) corresponding to the respective light-receiving sensor pixels. The image sensor 345 may be implemented with, but not limited to, a CCD sensor or a CMOS sensor.

The external light is collected by the lens assembly (e.g., lens assembly 210 in FIG. 2) of the camera module 340 and enters light-receiving sensor pixels through the corresponding micro lenses. The light-receiving sensor pixels may perform a photoelectric transformation to convert the light to electrical signals and output the electric signals to the processor 310, which processes the electric signals to generate an image. The micro lenses are arranged between the light-receiving sensor pixels and the lens assembly and the light passing through the lens assembly is refracted by the micro lenses and enters the corresponding light-receiving sensor pixels. In the disclosure, the light-receiving sensor pixels may mean unit pixels for sensing R/G/B independently of each other. Descriptions are made of the shape of a light-receiving sensor pixel and the arrangement of the micro lenses in detail with reference to FIG. 4.

According to various embodiments, a light-receiving sensor pixel may include at least one floating diffusion region (e.g., first to fourth floating diffusion regions) and may be divided into multiple areas (e.g., first and second areas) based on at least one floating diffusion region under the control of the processor 310. The signals generated by the multiple areas of the light-receiving sensor pixel may be distinguished from each other as different signals (e.g., first and second signals) to be read out through separate channels.

The floating diffusion regions are formed to block light between both areas divided by an electric potential rather than to physically divide a light-receiving sensor pixel. Each floating diffusion region connects to a transistor (not shown) and may be activated by adjusting voltage input to the transistor under the control of the processor 310. If the floating diffusion region is activated, the first and second areas of the light-receiving sensor pixel are separated to block therebetween, which makes it possible to detect light intensity and/or value independently between the first and second areas.

The floating diffusion regions may be arranged in a widthwise direction and/or a lengthwise direction of the light-receiving sensor pixel, and the floating diffusion regions arranged in the same direction may be parallel. The floating diffusion regions formed in the same direction may be arranged at left and right sides or top and bottom sides with respect to the center point of the light-receiving pixel, and a distance between the content point of the light-receiving sensor pixel and each floating diffusion region may be 0 to 0.3 times as long as a pitch of the light-receiving sensor pixel.

According to various embodiments, the separated areas (e.g., first and second areas) of the light-receiving sensor pixels may vary in size and differ in size from each other according to activated floating diffusion regions. For example, if the first floating diffusion region is activated, the first area may become larger than the second area; if the second floating diffusion region is activated, the second area may become larger than the first area. According to the sizes of the first and second areas separated by a floating region, the intensity of entering light may vary; for example, if the first area is larger than the second area, a more intense light may enter the first area. Descriptions are made of the changes of the sizes of the areas and intensities of the lights entering the areas in accordance with a floating diffusion region in detail with reference to FIGS. 5 and 6.

According to various embodiments, the processor 310 may activate a different floating diffusion region by a unit of a frame. That is, the processor may acquire images at multiple time points (e.g., 2 or 4 time points) for obtaining a high-resolution image. According to various embodiments, the processor 310 may acquire signal output from individual light-receiving sensor pixels by activation of at least one predetermined floating diffusion region at each time point. According to various embodiments, the processor 310 may divide a unit pixel of an up-sampling image corresponding to a light-receiving sensor pixel into multiple grids and determine pixel values of the respective grids based on the signals acquired at each time point.

For example, the processor 310 may activate the first floating diffusion region upon acquisition of an image of a first frame at a first time point in response to a shooting request input by means of a shooting button. In this case, the light-receiving sensor pixel may output the first and second signals corresponding respectively to the first and second areas separated by the first floating diffusion region, and the first and second signals may be read out as independent values through different channels. The processor may acquire a first image based on the signal output from a relatively large area (e.g., first area). After acquiring the first image corresponding to the first frame, the processor 310 may activate the second floating diffusion region. Here, the second floating diffusion region may be arranged in the same direction (e.g., lengthwise or widthwise direction) as that of the first floating diffusion region and at a symmetrically opposite side with respect to the center point of the light-receiving sensor pixel; in this case, the second area may be larger than the first area as opposed to the case where the first floating diffusion region is activated. Likewise, the first and second signals corresponding respectively to the first and second areas may be independently read out through different channels. The processor 310 may acquire a second image based on a signal output from the second area.

According to various embodiments, the processor 310 may synthesize the first image acquired by activating the first floating diffusion region at the first time point and the second image acquired by activating the second floating region at the second time point to generate a third image with a resolution higher than those of the first and second images. The resolution of the third image may be higher than that of the pixels of the image sensor 345. According to various embodiments, the processor 310 may register pixel values of the first and second images with the corresponding areas by a unit of a pixel to acquire an image with a resolution at least 2 times higher.

The above-disclosed embodiment should be considered as exemplary, and a description is made of the method for generating a high-resolution image based on images obtained by activating the floating diffusion regions at several time points (or frames) in detail with reference to FIGS. 7 to 12.

Although not shown in FIG. 3, the electronic device 300 may further include an input device 150, a communication module 190, and a sensor module 176 as the components of the electronic device 300 of FIG. 3, and the following description is directed to the operations of the processor 310 and the image sensor 345 for implementing various disclosed embodiments.

Figure 4:
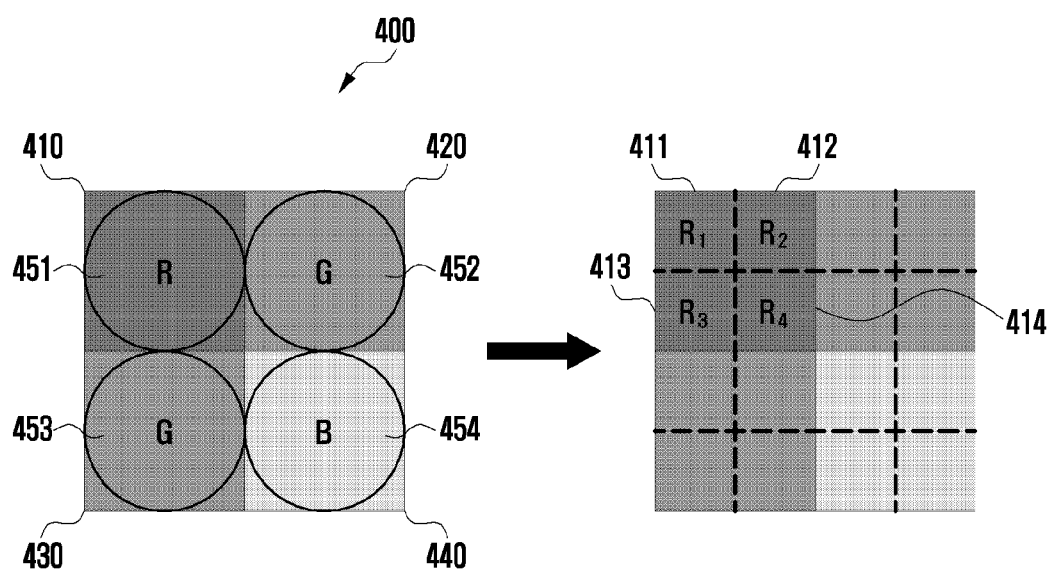
FIG. 4 is a diagram illustrating an exemplary unit pixel according to various embodiments.

FIG. 4 is a diagram illustrating an exemplary unit pixel according to various embodiments.

The left part of FIG. 4 shows a unit pixel 400 included in an image sensor (image sensor 345 in FIG. 3), which may sense the light passing through a pixel array of unit pixels 400 arranged in a matrix pattern and output an electric signal corresponding to the sensed light to a processor (e.g., processor 310 in FIG. 3). The right part of FIG. 4 exemplifies a high-resolution image generated by the processor.

As shown in the drawing, the unit pixel 400 may include multiple sub-pixels 410, 420, 430, and 440, i.e., an R sub-pixel 410, a B sub-pixel 440, and two G sub-pixels 420 and 430. The sub-pixels 410, 420, 430, and 440 may be the same types of devices that are capable of photoelectric transformation such as a photo diode, and the R/G/B sub-pixel may be provided with a color filter (not shown) that passes an R/G/B band light.

According to various embodiments, micro lenses 451, 452, 453, and 454 are arranged in a manner corresponding to the respective sub-pixels 410, 420, 430, and 40. The micro lenses 451, 452, 453, and 454 may have a function to refract the entering light passed through a lens assembly to the sub-pixels 410, 420, 430, and 440.

The sub-pixels 410, 420, 430, and 440 are separated by barriers such that the light entered a pixel may not be sensed at other sub-pixels.

The processor may acquire an image with a resolution higher (e.g., 2*2 times higher) than that of the unit pixels of the actual image sensor. As shown in the right part of FIG. 4, the processor may acquire an image with a resolution 2*2 times higher based on a signal output through the R sub-pixel. According to various embodiments, the R unit pixel 410 corresponding to an area of the high resolution image generated as described above may consist of 4 pixels, i.e., R1 to R4 411, 412, 413, and 414.

Figure 5:
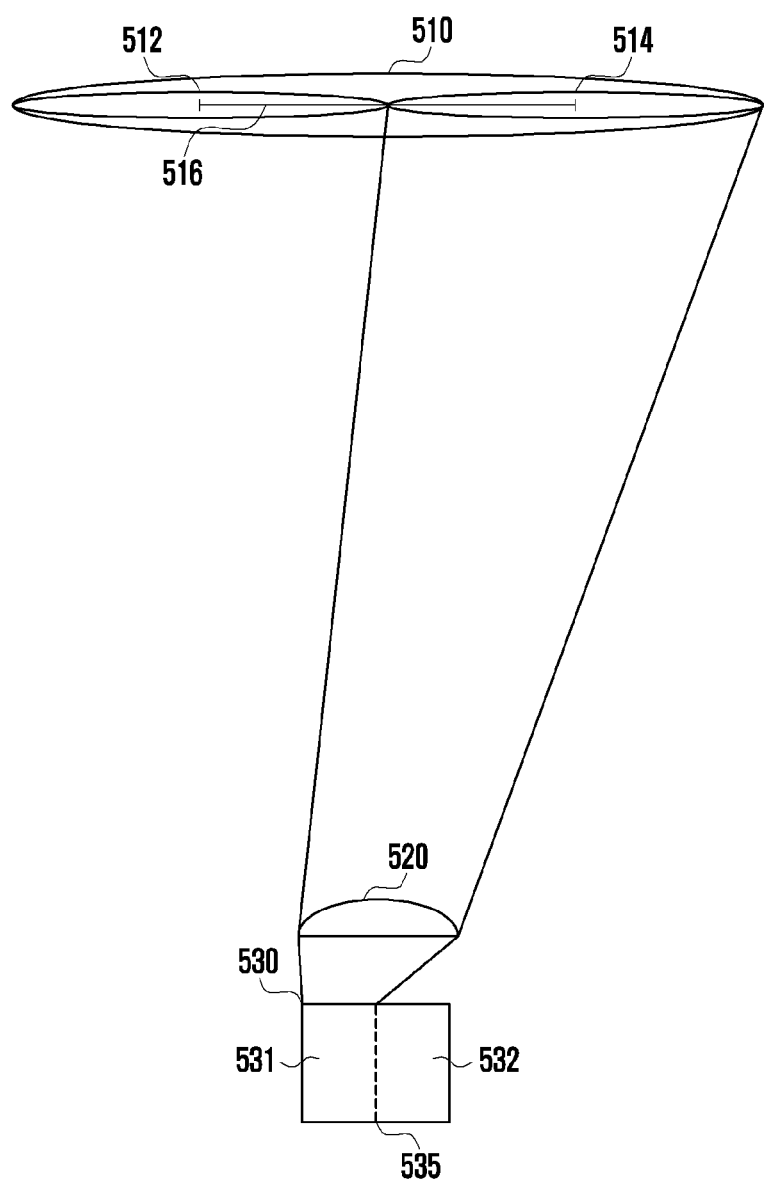
FIG. 5 is a diagram illustrating a lens, a micro lens, and a light-receiving sensor pixel according to various embodiments.

FIG. 5 is a diagram illustrating a lens, a micro lens, and a light-receiving sensor pixel according to various embodiments.

In FIG. 5, the lens 510 may be one of the lens constituting a lens assembly, and the light passed through the lens may enter the light-receiving sensor pixel 530 through the micro lens 520. Here, the light-receiving sensor pixel 530 may correspond to one of the sub-pixels 410, 420, 430, and 440 of FIG. 4.

According to various embodiments, the light-receiving sensor pixel 530 may be divided into two or more areas (first and second areas 531 and 532). As shown in the drawing, a floating diffusion region 535 may be formed at a center of the light-receiving sensor pixel 530. The floating diffusion region 535 may be activated or deactivated according to a control signal input from a processor (e.g., processor 310 in FIG. 3).

As shown in the drawing, if the floating diffusion region 535 is activated, the light passed through a right area 514 of the lens 510 may be refracted by the micro lens 520 and proceed to enter the left area 531 of the light-receiving sensor pixel with respect to the floating diffusion region 535, and the light passed through a left area 512 of the lens 510 may be refracted by the micro lens 520 and proceed to enter the right area 532 of the light-receiving sensor pixel 530 with respect to the floating diffusion region 535

An image sensor may read out signals corresponding to the areas 531 and 532 of the light-receiving sensor pixel 530 that are separated with respect to the floating diffusion region 535.

Figure 6:
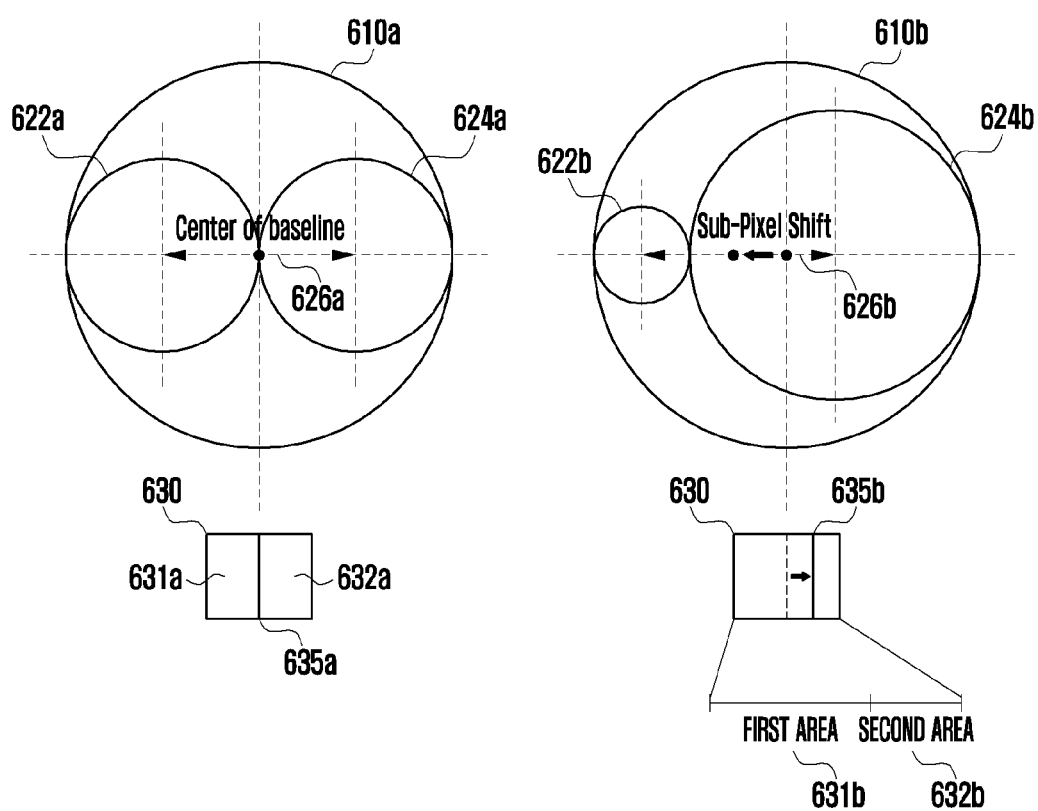
FIG. 6 is a diagram illustrating an exemplary sub-pix shift as a floating diffusion region is shifted according to various embodiments.

FIG. 6 is a diagram illustrating an exemplary sub-pix shift as a floating diffusion region is shifted according to various embodiments.

The left part of FIG. 6 shows the case where a floating diffusion region 635a formed at the center of the light-receiving sensor pixel 630 is activated. In this case, an area 624a of a lens 610a through which light enters to a first area 631a at the left side of the light-receiving sensor pixel 630 and an area 622a of the lens 610a through which the light enters to a second area 632a at the right side of the light-receiving sensor pixel 630 may be equal in size to each other.

According to various embodiments, the image sensor may take a left image and a right image by activating the floating diffusion region 635a of the light-receiving sensor pixel as if being output by a stereo camera with a binocular disparity. Here, a base line of the camera with the binocular disparity may correspond to a radius of the lens 610a.

The right part of FIG. 6 shows the case where the floating diffusion region is shifted to the left from the center of the light-receiving sensor pixel 30. According to various embodiment, the light-receiving sensor pixel 630 may include multiple floating diffusion regions that can each be turned on/off, and the right part of FIG. 6 may correspond to the case where the floating diffusion region 635b formed at the right side of the light-receiving sensor pixel 630 is activated among the multiple floating diffusion regions.

In this case, the effective aperture of the first area 631b is expanded, leading to an increase of the light amount entering the first area 631b and a decrease of the light amount entering the second area 632b for a disparity image. It is also shown that the center of the baseline 626b is shifted from the center of the lens 610b without any change in the length of the baseline 626b of the lens 610b even when the location of the activated floating diffusion region is changed.

That is, the expansion of the first area 631b may increase the size of an area 624b through which the light enters the first area 631b and decrease the size of an area 622b through which the light enters the second area 632b.

FIGS. 7 to 12 are diagrams illustrating a pixel-level image up-sampling method according to various embodiments.

Figure 7:
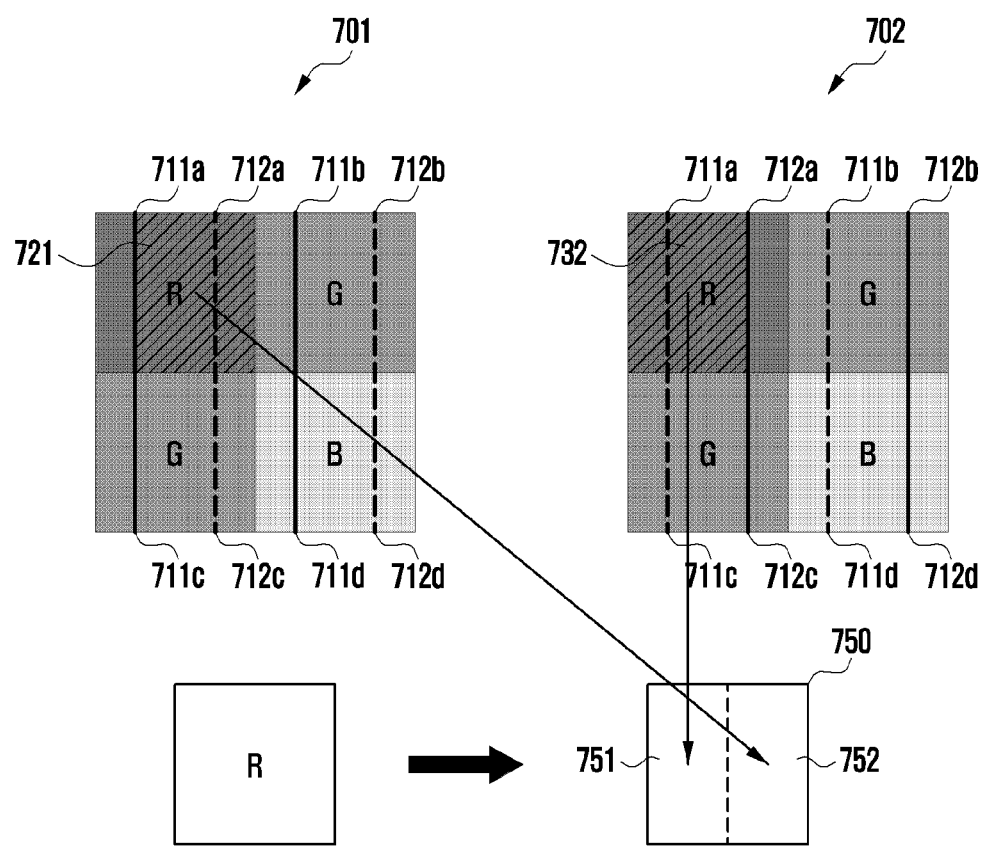
FIGS. 7 to 12 are diagrams illustrating a pixel-level image up-sampling method according to various embodiments.

FIG. 7 shows an image up-sampling method for generating an image up-sampled 2 times from two frames using two floating diffusion regions according to embodiment 1.

As shown in the drawing, a unit pixel denoted by reference numbers 701 and 702 may include multiple sub-pixels, e.g., an R sub-pixel, a B sub-pixel, and two G sub-pixels.

In this embodiment, a light-receiving sensor pixel may include a first floating diffusion region and a second floating diffusion region that may each be turned on/off: first and second floating diffusion regions 711a and 712a for the R sub-pixel, first and second floating diffusion regions 711d and 712d for the B sub-pixel, first and second floating diffusion regions 711b and 712b for a first G sub-pixel, and first and second floating diffusion regions 711c and 712c for a second G sub-pixel as shown in the drawing. According to various embodiments, it may be possible that the floating diffusion regions formed at the same location with respect to the individual sub-pixels of each unit pixel and all pixels belonging to a pixel array are activated at the same time point. In the following description, the R sub-pixel is referred to as light-receiving sensor pixel for convenience of explanation.

A processor (e.g., processor 310 in FIG. 3) may activate one of the first and second floating diffusion regions per frame. Although the first and second floating diffusion regions 711a and 712a are vertically formed at a horizontal interval in the light-receiving sensor pixel, they may also be horizontally formed.

The processor may activate the first floating diffusion region 711a for a first frame 701. In this case, a first area 721 large in proportion is formed at the right side, and a second area 722 small in proportion is formed at the left side with respect to the first floating diffusion region 711a. The processor may acquire a first image based on a first signal corresponding to the first area 721. According to an embodiment, the processor may ignore a second signal corresponding to the second area 722 in generating an image from the first frame 701.

After acquiring the first image, the processor may activate the second floating diffusion region 712a for the second frame 702. In this case, a first area 731 small in proportion is formed at the right side, and a second area 732 large in proportion is formed at the right side with respect to the second floating diffusion region 712a. According to an embodiment, the processor may ignore a first signal corresponding to the first area 731 in generating an image from the second frame 702.

According to various embodiments, the processor may generate a third image with a resolution higher than those of the first and second images by synthesizing the first and second images. With reference to the R sub-pixel, because the first image is generated based on a signal detected from the first area (e.g., area 721 and 731) formed at the right side of the light-receiving sensor pixel, it may be possible to use a value, as denoted by reference number 721, of the corresponding R sub-pixel of the first image for a right pixel 752 of a specific R sub-pixel 750 in generating the third image. For a left pixel 751 of the specific R sub-pixel 750 of the third image, a value, as denoted by reference number 732, of the corresponding R sub-pixel of the second image may be used.

In this embodiment, an image with a resolution 2 times higher in the widthwise direction than the resolution of the pixel array of the image sensor can be generated with a value of the right area 721 of the light-receiving sensor pixel, the value being acquired by activating the first floating diffusion region 711a at the first time point, and a value of the left area 732 of the light-receiving sensor pixel, the value being acquired by activating the second floating diffusion region 712a at the second time point.

Figure 8A:
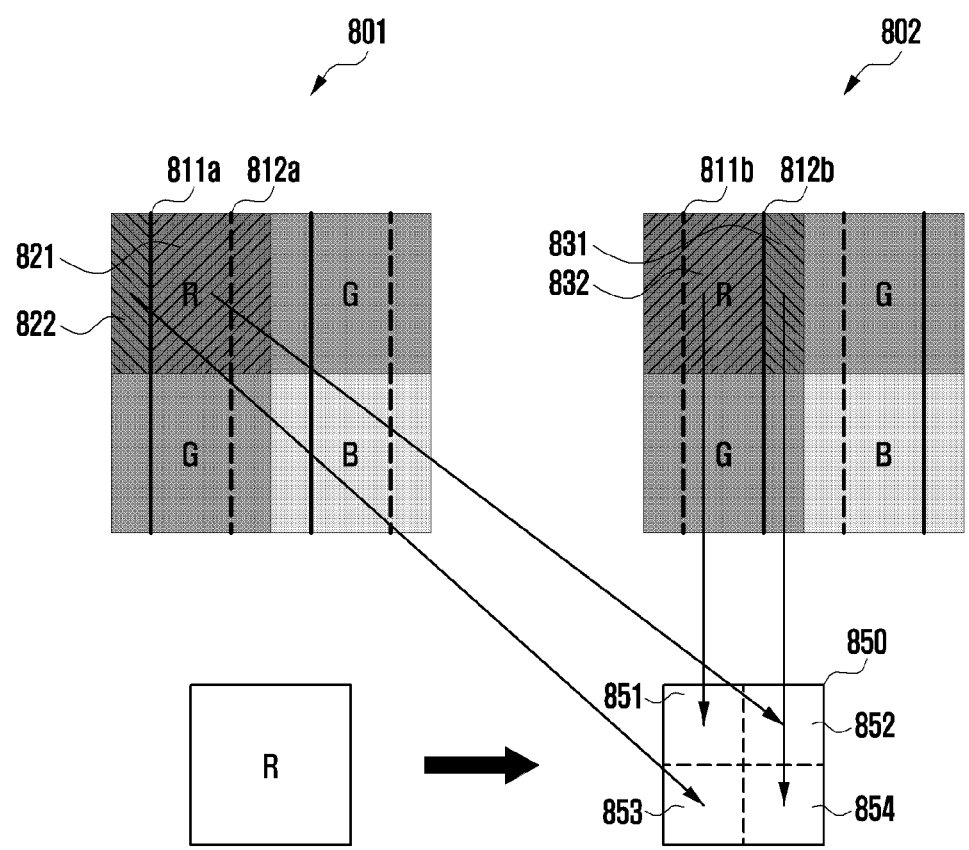

FIG. 8A shows an image up-sampling method for generating an image up-sampled 2*2 times from two frames using two floating diffusion regions according to embodiment 2-1.

In this embodiment, the processor may generate a first image based on a signal corresponding to a first area 821 and a fourth image based on a signal corresponding to a second area 822 in a first frame 801, the first and second areas 821 and 822 being formed by activating a first floating diffusion region 811a. That is, the first image is generated based on the value detected at the area 821 formed at the right side of the light-receiving sensor pixel in the first frame 801, and the fourth image is generated based on the value detected at the area 822 formed at the left side of the light-receiving sensor pixel in the first frame 801. The first and fourth images may be input to the processor through separate channels.

The processor may generate a second image based on a signal corresponding to a second area 832 and a fifth image based on a signal corresponding to a first area 831 in a second frame 802, the second area 832 and the first area 831 being formed by activating a second floating diffusion region 812a. That is, the second image is generated based on the value detected at a left pixel 832 of the light-receiving sensor pixel in the second frame 802, and the fifth image is generated based on the value detected at a right pixel 831 of the light-receiving sensor pixel in the second frame 802. The second and fifth images may be input to the processor through separate channels.

According to an embodiment, the first and fifth images corresponding to the signal from the first area are input to the processor through a first channel, and the second and fourth images corresponding to the second area are input to the processor through a second channel.

The processor may generate a third image based on the first and second images input through two channels at a first time point. The processor may also generate a sixth image based on the fourth and fifth images input through two channels at the first time point.

The processor may generate a seventh image by synthesizing the third and sixth images. In the embodiment of FIG. 8, the values of the first and second areas 821 and 822 that are generated at the first time point are respectively input to the sub-pixel 852 formed at a top-right corner and the sub-pixel 853 formed at a bottom-left corner, and the values of the second and first areas 832 and 831 that are generated at the second time point are respectively input to the sub-pixel 851 formed at a top-left corner and the sub-pixel 854 formed at a bottom-right corner. In this manner, the processor may generate a high-resolution image by inputting the generated pixel values to corresponding sub-pixel positions.

In this embodiment, it is possible to generate an image with a resolution 2*2 times higher in the widthwise and lengthwise directions than resolution of the pixel array of the image sensor.

Figure 8B:
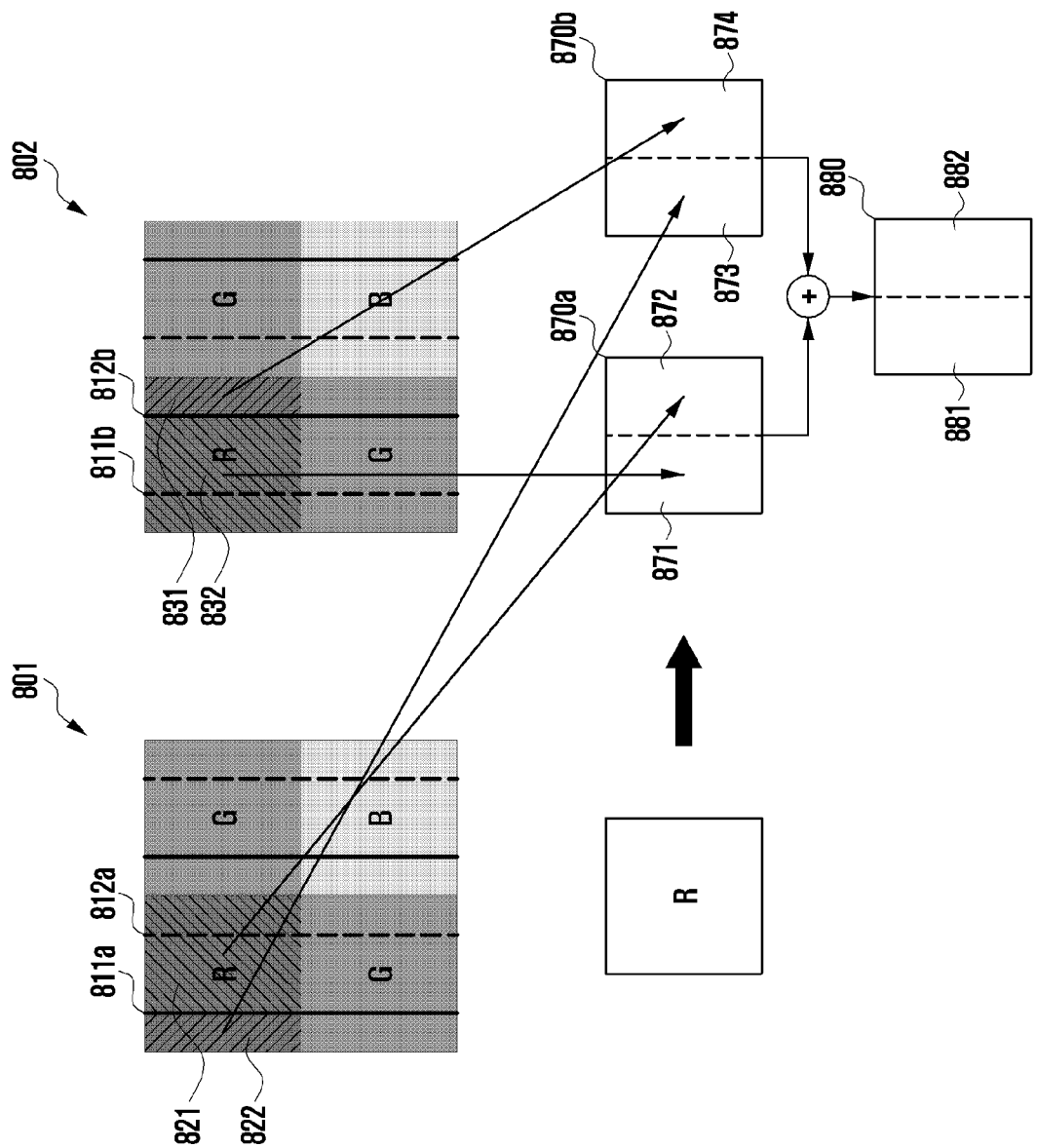

FIG. 8B shows an image up-sampling method for generating an image up-sampled 2 times from two frames using two floating diffusion regions according to embodiment 2-2.

In this embodiment, the processor may activate a first floating diffusion region 811a in a first frame to form a first area 821 outputting a signal and a second area 822 outputting a signal and activate a second floating diffusion region 812b in a second frame to form a first area 831 outputting a signal and a second area 832 outputting a signal.

The processor may acquire a third image and a sixth image based on the signals output in the first and second frames. The signals forming the third and sixth images referred to in FIG. 8B may differ from the signals forming the third and sixth images referred to in FIG. 8A.

The processor may generate the third image 870a based on the signal corresponding to the second area 822 of the first frame and the signal corresponding to the first area 831 of the second frame. As shown in the drawing, the signal of the first area 831 of the second frame may enter a left sub-pixel 871 of the third image, and the signal of the second area 822 of the first frame may enter a right sub-pixel 872 of the third image. The processor may also generate the sixth image 870b based on the signal corresponding to the first area 821 of the first frame and the signal corresponding to the second area 832 of the second frame. As shown in the drawing, the signal of the first area 821 of the first frame enters a left sub-pixel 873 of the sixth image and the signal of the second area 832 of the second frame enters a right sub-pixel 874 of the sixth image.

The processor may generate a seventh image 880 by synthesizing the third and sixth images 870a and 870b. According to an embodiment, it may be possible to determine a value for the left sub-pixel 881 of the seventh image by summing the value of the left sub-pixel 871 of the third image and the value of the left sub-pixel 873 of the sixth image and a value for the right sub-pixel 882 of the seventh image by summing the value of the right sub-pixel 872 of the third image and the value of the right sub-pixel 874 of the sixth image.

In this embodiment, it may be possible to generate an image with a resolution 2 times higher in the widthwise direction than the resolution of the pixel array of the image sensor. In this embodiment, although the description is directed to the case where the floating diffusion regions 811 and 812 are formed in the lengthwise direction to enhance the resolution in the widthwise direction, it may also be possible to form the floating diffusion regions in the widthwise direction to enhance the resolution 2 times higher in the lengthwise direction.

Figure 9:
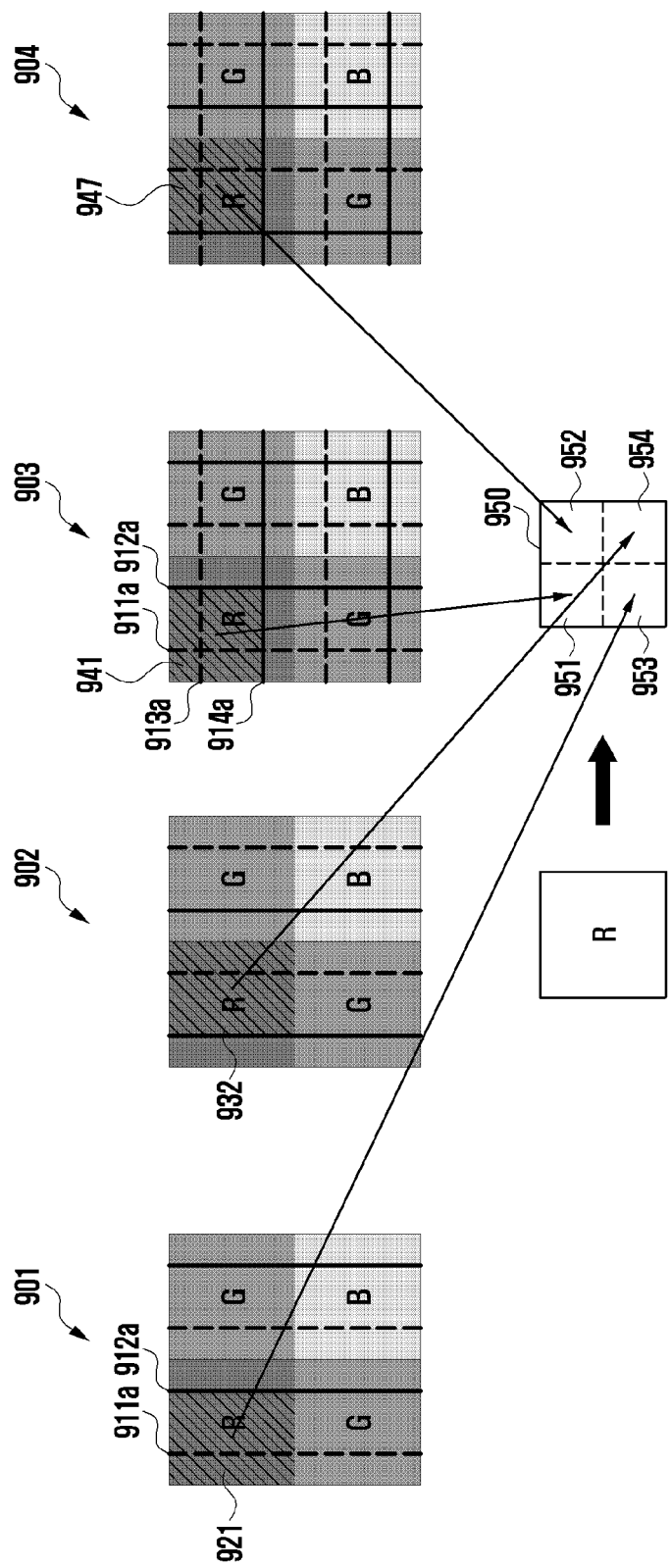

FIG. 9 is a diagram illustrating an image up-sampling method for generating an image up-sampled 2*2 times from four frames using four floating diffusion regions according to embodiment 3.

According to various embodiments, a light-receiving sensor pixel may include a first floating diffusion region 911a and a second floating diffusion region 912a that are arranged in the widthwise direction and a third floating diffusion region 913a and a fourth floating diffusion region 914a that are arranged in the lengthwise direction so as to perpendicularly cross the first and second floating diffusion regions 911a and 912a. As shown in FIG. 9, one of at least one widthwise floating diffusion region (e.g., third floating diffusion region 913a and/or fourth floating diffusion region 914a) may be activated in addition to the first floating diffusion region 911a or the second floating diffusion region 912a formed in the lengthwise direction in the third and fourth frames 903 and 904.

In this embodiment, the processor may generate a first image with a signal corresponding to a first area 921, which is formed by activating the first floating diffusion region 911a in the first frame 901. According to an embodiment, a signal of a second area with a small size may not be used in generating a high-resolution image.

The processor may generate a second image with a signal corresponding to a second area 932, which is formed by activating the second floating diffusion region 912a. In this embodiment, only the first floating diffusion region 911a or the second floating diffusion region 912a is activated in the first frame 901 and at the second time point 902 while the third and fourth floating diffusion regions 913a and 914a formed in the widthwise direction are deactivated.

The processor may activate the first and fourth floating diffusion region 911a and 914a at a third time point 903 and generate an eighth image based on a value of a sub-pixel 941 formed at the left side of the light-receiving sensor pixel. The processor may also activate the second and fourth floating diffusion regions 912a and 914a in the fourth frame 904 and generate a high-resolution image based on a value of a sub-pixel at the top-right area 947 of the light-receiving sensor pixel.

As shown in the drawing, the values of the R sub-pixel that are generated at respective time points enter to the corresponding areas of the R sub-pixel of the high-resolution image. For example, the value of the area 921 of the first frame may enter an area 953 of the image pixel, the value of the area 932 of the second frame may enter an area 954 of the image pixel, the value of the area 941 of the third frame may enter an area 951 of the image pixel, and the value of the area 947 may enter an area 952 of the image pixel.

Figure 10:
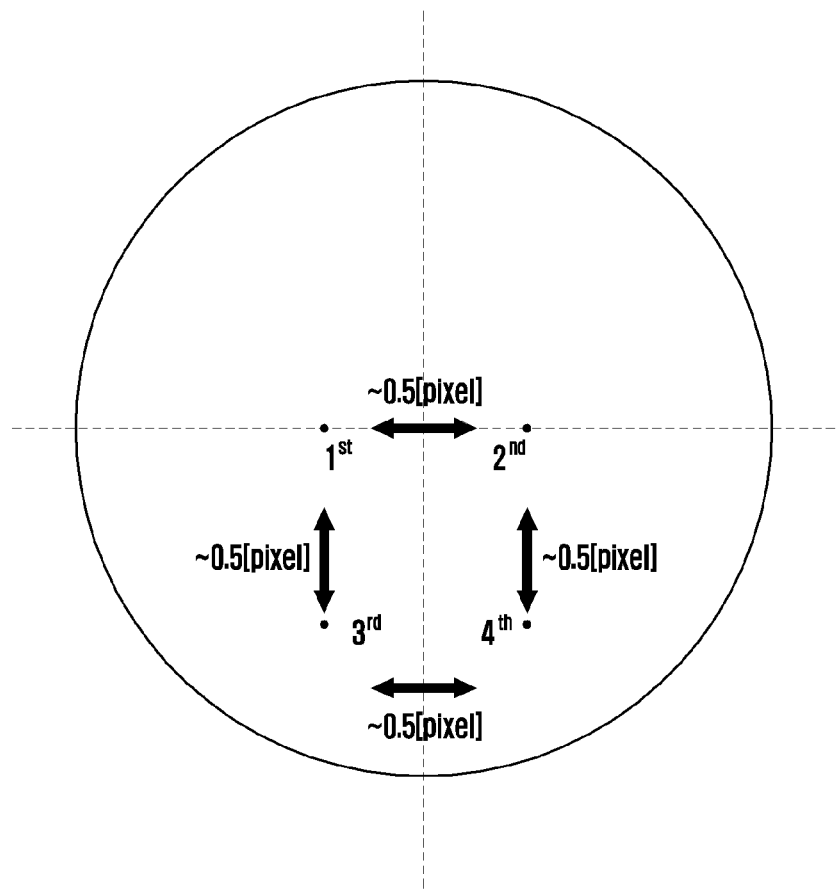

FIG. 10 is a diagram illustrating a shift of a center of a sub-pixel on a lens as an activated floating diffusion region is changed in embodiment 3 of FIG. 9. As shown in the drawing, the center of the sub-pixel may be shifted a little to the left from the center of the lens as the first floating diffusion region is activated in the first frame, to the right from the center of the lens as the second floating diffusion region is activated, to the bottom-left from the center of the lens as the first and fourth floating diffusion regions are activated, and to the bottom-right from the center of the lens as the second and fourth floating diffusion regions are activated. According to various embodiments, the shift may be made by 0.5 of a pixel in each frame.

Figure 11:
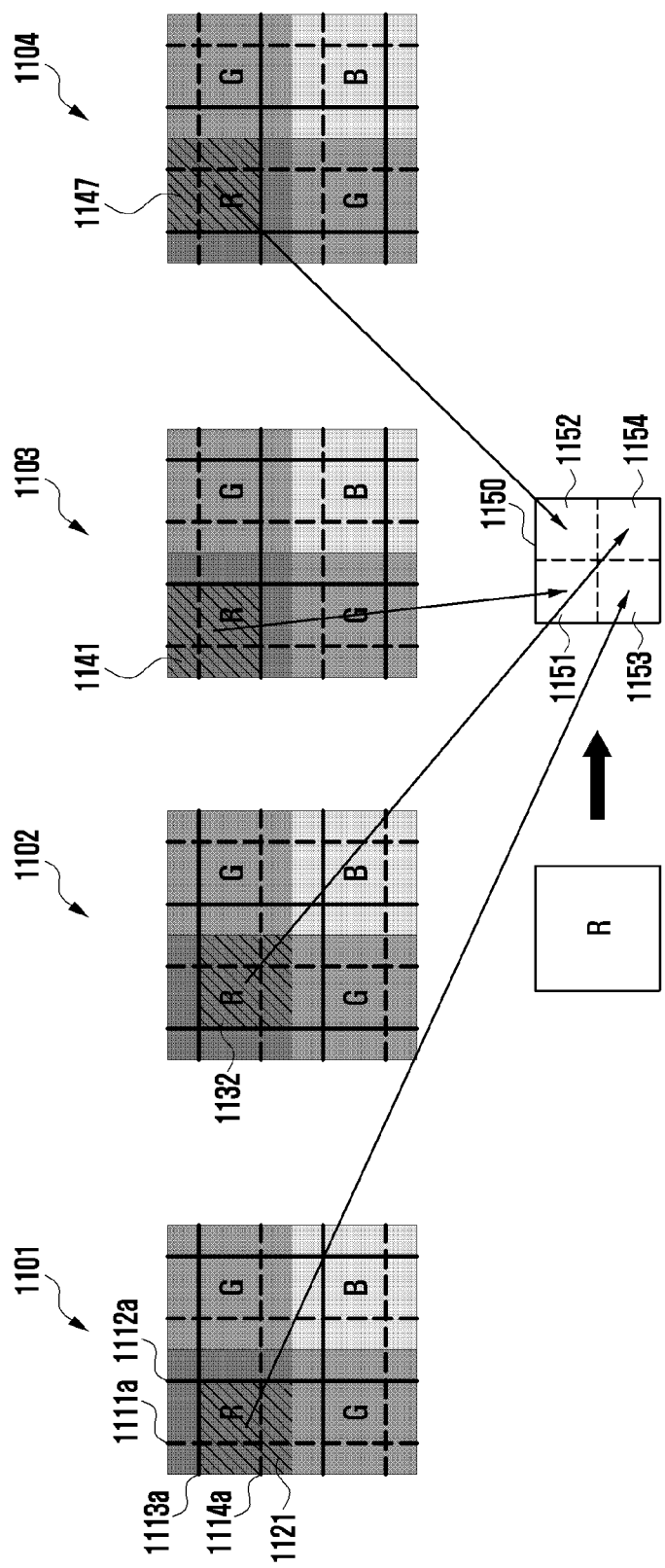

FIG. 11 is a diagram illustrating an image up-sampling method for generating an image up-sampled 2*2 times from four frames using four floating diffusion regions according to embodiment 4.

In this embodiment, a processor may activate one of lengthwise floating diffusion regions 1111a and 1112a and one of widthwise floating diffusion regions 1113a and 1114a at each time point.

The processor may activate the first floating diffusion region 1111a and the third floating diffusion region 1113a in a first frame 1101 to acquire a value of a bottom-left area 1121 for a sub-pixel. The processor may activate the second floating diffusion region 1112a and the third floating diffusion region 1113a in a second frame 1102 to acquire a value of a bottom-right area 1132 for the sub-pixel. The processor may activate the second diffusion region 1112a and the fourth floating diffusion region 1114a in a third frame 1103 to acquire a value of a top-left area 1141 for the sub-pixel. The processor may activate the second floating diffusion region 1112a and the third floating diffusion regions 1113a in a fourth frame 1104 to acquire a value of a top-right region 1147 for the sub-pixel.

The processor may acquire an image up-sampled 2*2 times by entering the values acquired at respective time points for the sub-pixel into corresponding areas of the sub-pixel.

Figure 12:
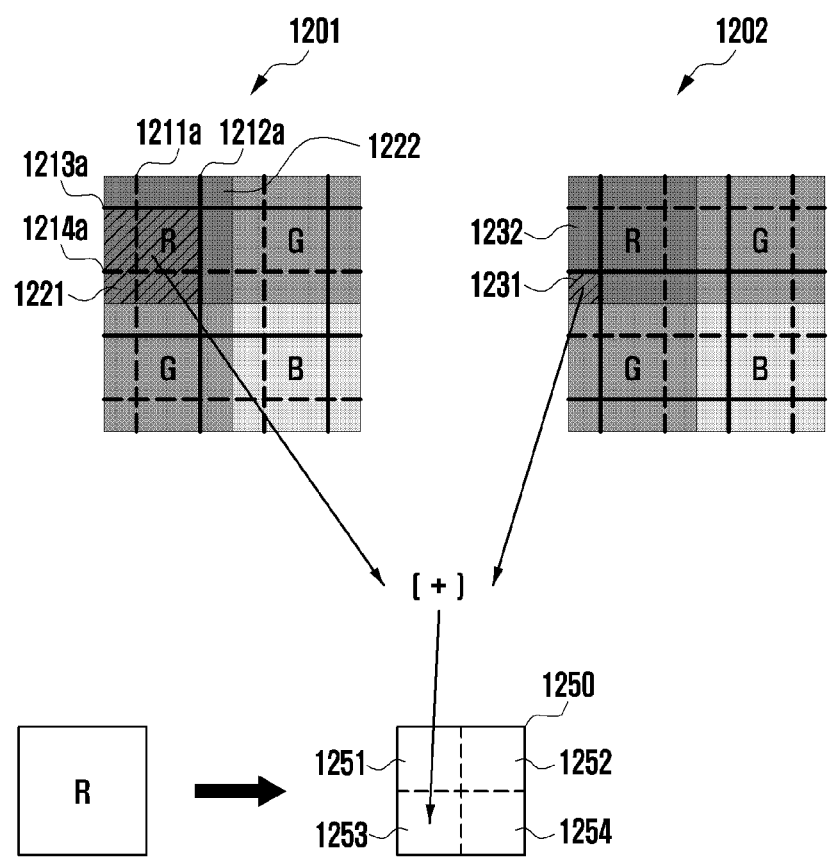

According to various embodiments, the processor may enter a sum of values acquired at different time points into a corresponding area of a high-resolution image. For example, as shown in FIG. 12, the processor may acquire a value of a bottom-left area 1221 by activating a first floating diffusion region 1211a and a third floating diffusion region 1213a in a first frame 1201 and a value of another bottom-left area 1231 by activating a second floating diffusion region 1212a and a fourth floating diffusion region 1214a.

The processor may enter a sum of the values of the bottom-left areas 1221 and 1231 into a bottom-left are 1253 of a sub-pixel of a high-resolution image.

According to various embodiments, an electronic device may include an image sensor 345 and a processor 310, wherein the image sensor 345 may include a micro lens 520 and a light-receiving sensor pixel 530 converting light passed through the micro lens 520 to an electric signal, the light-receiving sensor pixel 530 comprising a first floating diffusion region 711a and a second floating diffusion region 712a, and may be configured to divide the light-receiving sensor pixel 530 into a first area and a second area based on one of the first and second floating diffusion regions 711a and 712a being activated, the first and second areas being different in size, and read out signals generated by the light-receiving sensor pixel 530, the signals may include a first signal corresponding to the first area and a second signal corresponding to the second area; and the processor 310 may be configured to control the image sensor 345 to activate the first floating diffusion region 711a to acquire a first image of an external object and may activate the second floating diffusion region 712a to acquire a second image of the external object and to synthesize at least part of the first image and at least part of the second image to generate a third image having a resolution higher than the resolution of the first image or the second image.

According to various embodiments, the image sensor 345 may be configured to form the first area and the second area that is smaller than the first area based on the first floating diffusion region 711a being activated and form the first area and the second area that is larger than the first area based on the second floating diffusion region 712a being activated.

According to various embodiments, the first and second floating diffusion regions 711a and 712a may be formed in parallel in a widthwise direction or lengthwise direction of the light-receiving sensor pixel 530.

According to various embodiments, the processor 310 may be configured to control to acquire the first image based on a signal corresponding to the first area among the signals acquired based on the first floating diffusion region 711a of the image sensor 345 being activated and the second image based on a signal corresponding to the second area among the signals acquired based on the second floating diffusion region 712a of the image sensor 345 being activated.

According to various embodiments, the processor 310 may be configured to acquire the first image by activating the first floating diffusion region 711a at a first time point and the second image by activating the second floating diffusion region 712a at a second time point.

According to various embodiments, the first signal output from multiple light-receiving sensor pixels 530 of the image sensor 345 may be input to the processor 310 through a first channel, and the second signal output from the multiple light-receiving sensor pixels 530 may be input to the processor 310 through a second channel.

According to various embodiments, the processor 310 may be configured to control to acquire a fourth image based on a signal corresponding to the second area among the signals acquired based on the first floating diffusion region 711a of the image sensor 345 being activated and a fifth image based on a signal corresponding to the first area among the signals acquired based on the second floating diffusion region 712a of the image sensor 345 being activated and generate a sixth image with a resolution higher than a resolution of the fourth or fifth image by synthesizing at least part of the fourth image and at least part of the fifth image.

According to various embodiments, the processor 310 may be configured to control to generate a seventh image by synthesizing the third and sixth images.

According to various embodiments, the light-receiving sensor pixel 530 may further include a third floating diffusion region and a fourth floating diffusion region formed perpendicularly with respect to the first and second floating diffusion regions 711a and 712a.

According to various embodiments, the processor 310 may be configured to control the image sensor 345 to acquire the first image by activating the first floating diffusion region 711a and the third floating diffusion region and the second image by activating the second floating diffusion region 712a and the third floating diffusion region.

According to various embodiments, the processor 310 may be configured to control the image sensor 345 to acquire an eighth image by activating the first floating diffusion region 711a and the fourth floating diffusion region and a ninth image by activating the second floating diffusion region 712a and the fourth floating diffusion region and generate a tenth image by synthesizing the first, second, eighth, and ninth images.

According to various embodiments, an electronic device may include an image sensor 345 including multiple light-receiving sensor pixels 530 and a processor 310 that is electrically connected to the image sensor 345, wherein the image sensor 345 may include the light-receiving sensor pixels 530 each including multiple floating diffusion regions of which at least one is divided into multiple areas based on at least one of the multiple floating diffusion regions being activated and may be configured to convert light detected in the multiple areas to an electric signal and send the electric signal to the processor 310; and the processor 310 may be configured to control to activate at least one predetermined floating diffusion region at each of predetermined time points to acquire a signal output from each of the light-receiving sensor pixels 530 and generate an up-sampled image based on the signals acquired at multiple time points.

According to various embodiments, the multiple floating diffusion regions may include a plurality of lengthwise floating diffusion regions formed in a lengthwise direction and a plurality of floating diffusion regions formed in a widthwise direction within the light-receiving sensor pixel 530, and the processor 310 may be configured to control to activate one of the floating diffusion regions formed in the lengthwise direction and/or one of the floating diffusion regions formed in the widthwise direction at a predetermined time point.

According to various embodiments, the processor 310 may be configured to control to divide a unit pixel of the up-sampled image corresponding to the light-receiving sensor pixel 530 into multiple grids and determine a pixel value of each of the grids based on the signals acquired at each time point.

Although the descriptions have been made of the components with specific reference numbers for convenience of explanation, the embodiments are not limited by the components corresponding to the reference numbers.

Figure 13:
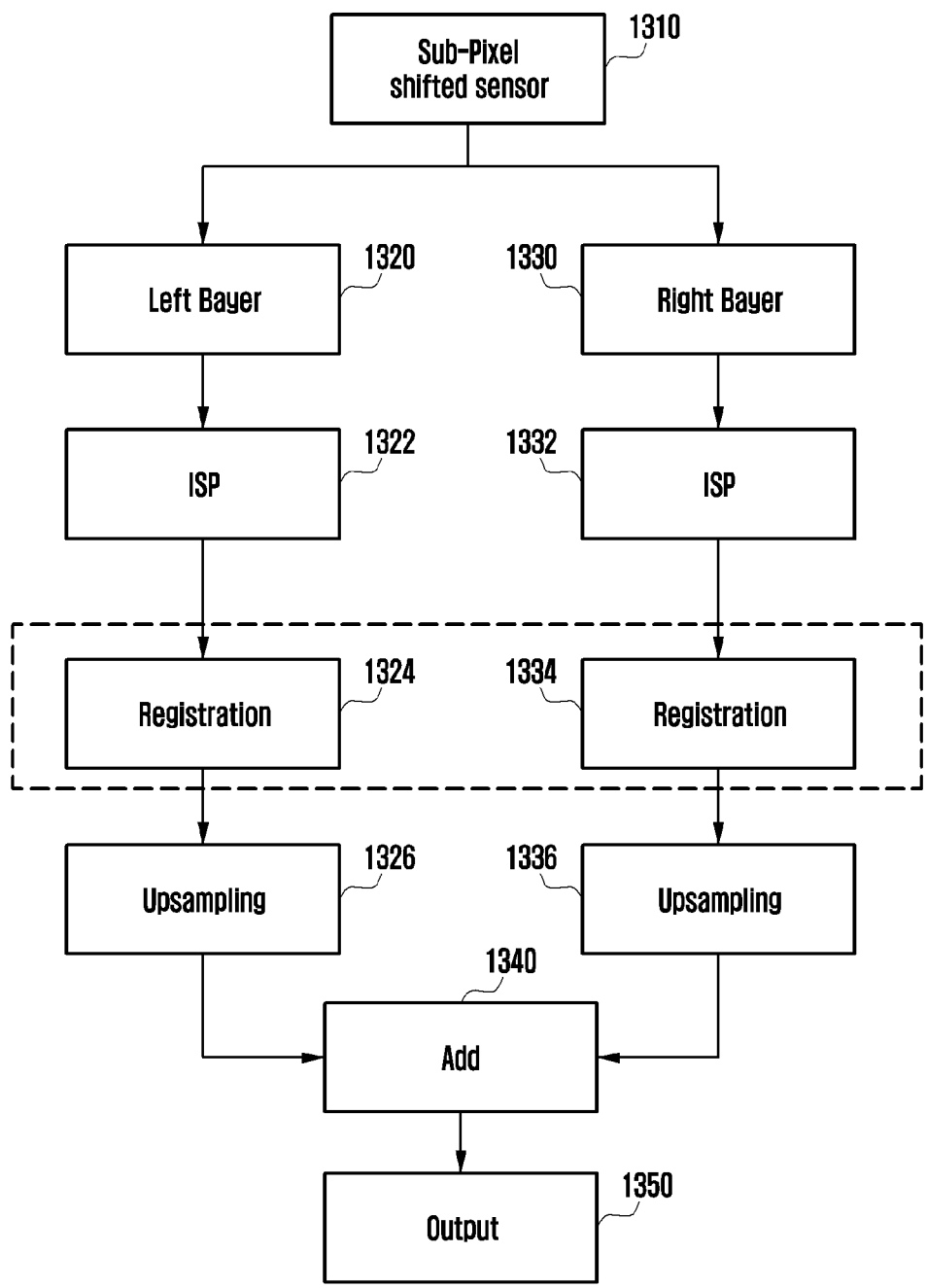
FIG. 13 is a flowchart illustrating an up-sampling procedure according to various embodiments.

FIG. 13 is a flowchart illustrating an up-sampling procedure according to various embodiments.

At operation 1310, a processor (e.g., processor 310 in FIG. 3) may shift a sensing area of a light-receiving sensor pixel by a unit of a sub-pixel by activating a floating diffusion region shifted to a side from a center of the light-receiving sensor pixel. The processor may activate different floating diffusion regions for multiple frames (e.g., 4 frames).

The processor may acquire, at operation 1320, a left Bayer value among signals received by the light-receiving sensor pixel and obtain, at operation 1322, a YUV value or an RGB value of the left Bayer through an image signal processor (ISP).

The processor may perform, at operation 1324, a registration based on a first frame and generate, at operation 1326, an image up-sampled 2 times only with the left Bayer value. Here, the up-sampling may be performed by arranging the left Bayer value obtained at individual locations of a grid up-sampled 2 times.

The processor may perform an up-sampling process of operations 1330 to 1336 for a right Bayer simultaneously with at least part of operations 1320 to 1326. In more detail, the processor may acquire, at operation 1330, a right Bayer value among signals received by the light-receiving sensor pixel and obtain, at operation 1332, a YUV value or an RGB value of the right Bayer through an ISP. The processor may perform, at operation 1334, a registration based on the first frame and generate, at operation 1336, an image up-sampled 2 times only with the right Bayer value.

After performing the up-sampling of the left Bayer and the right Bayer, the processor may acquire an up-sampled image by summing the YUV or RGB data of the left Bayer and right Bayer by a unit of a pixel at operation 1340. At operation 1350, the processor may output the up-sampled image.

Figure 14:
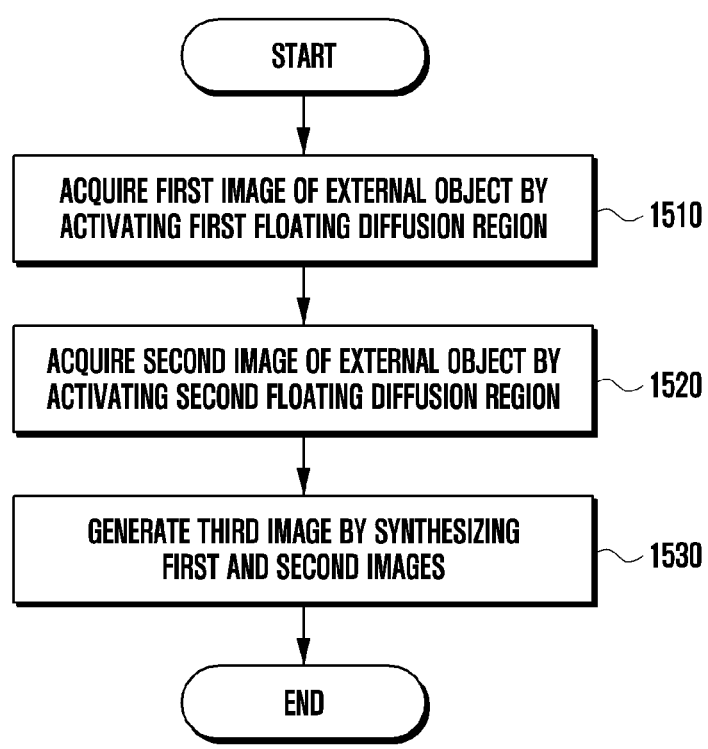
FIGS. 14 and 15 are flowcharts illustrating an image up-sampling method of an electronic device according to various embodiments.

FIG. 14 is a flowchart illustrating an image up-sampling method of an electronic device according to various embodiments.

The proposed method may be performed by the electronic device described with reference to FIGS. 1 to 13, and the technical features that already have been described above are omitted hereinbelow.

At operation 1510, a processor (e.g., processor 120, image signal processor 260, and processor 310) may activate a first floating diffusion region (e.g., first floating diffusion region 711a) of a light-receiving sensor pixel (e.g., light-receiving sensor pixel 530 in FIG. 5 and unit pixel 701 in FIG. 7) to acquire a first image of an external object.

According to various embodiments, the light-receiving sensor pixel may include multiple floating diffusion regions that are turned on/off according to a control signal from the processor. The light-receiving sensor pixel may be divided into a first area and a second area by the activated floating diffusion region. The processor may generate the first image based on a first signal of the light-receiving sensor pixel configured according to the activation of the first floating diffusion region.

At operation 1520, the processor may acquire a second image of the external object by activating a second floating diffusion region (e.g., first floating diffusion region 712a in FIG. 7) of the light-receiving sensor pixel. The processor may generate a second image based on a second signal of the light-receiving sensor pixel configured according to the activation of the second floating diffusion region.

At operation 1530, the processor may generate a third image by synthesizing the first and second images. The processor may acquire an image with a resolution at least 2 times higher by registering the pixel values of the first and second images with the corresponding areas.

Figure 15:
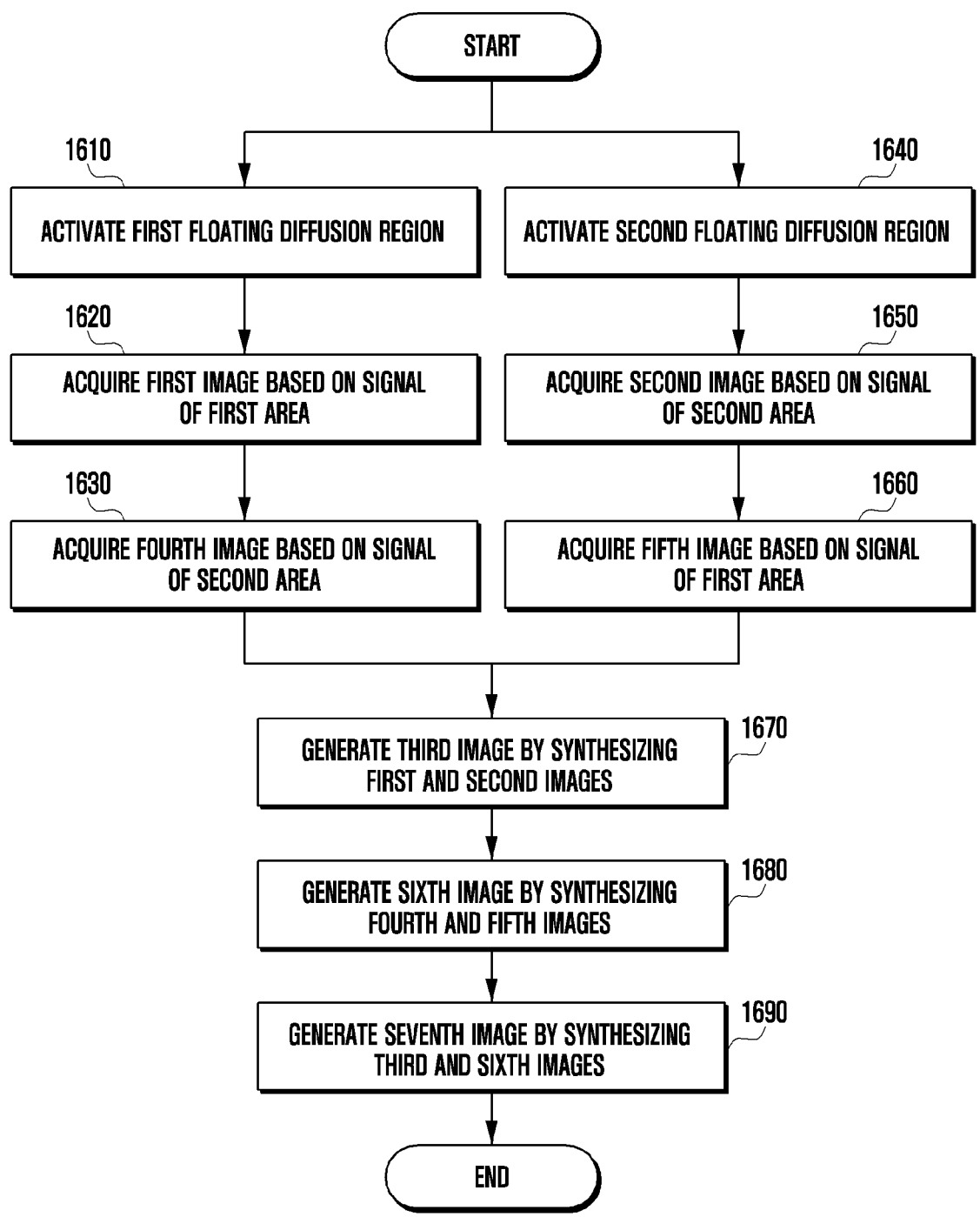

FIG. 15 is a flowchart illustrating an image up-sampling method of an electronic device according to various embodiments.

At operation 1610, a processor (e.g., processor 120, image signal processor 260, and processor 310) may activate a first floating diffusion region.

At operation 1620, the processor may acquire a first image based on a signal of a first area separated from a second area by the first floating diffusion region (e.g., first diffusion region 711a in FIG. 7). When the first floating diffusion region is diffused, the first area may be larger than the second area.

At operation 1630, the processor may acquire a fourth image based on a signal of the second area separated from the first area by the first floating diffusion region.

Operations 1610 to 1630 may be performed for an image of a first frame at a first time point.

At operation 1640, the processor may activate a second floating region (e.g., second floating region 712a in FIG. 7).

At operation 1650, the processor may acquire a second image based on a signal of a second area separated from a first area by the second floating region. When the second floating diffusion region is diffused, the second area may be larger than the first area.

At operation 1660, the processor may acquire a fifth image based on a signal of the first area separated from the second area by the second floating diffusion region.

Operations 1640 to 1660 may be performed for an image of a second frame at a second time point.

At operation 1670, the processor may generate a third image by synthesizing the first and second images.

At operation 1680, the processor may generate a sixth image by synthesizing the fourth and fifth images.

At operation 1670, the processor may generate a seventh image by synthesizing the third and sixth images.

According to various embodiments, an image up-sampling method of an electronic device may include acquiring a first image of an external object at operation 1510 by activating a first floating diffusion region of a light-receiving sensor pixel, acquiring a second image of the external object at operation 1520 by activating a second floating diffusion region of the light-receiving sensor pixel, and generating a third image at operation 1530 by synthesizing at least part of the first image and at least part of the second image, the third image having a resolution higher than a resolution of the first or second image.

According to various embodiments, the light-receiving sensor pixel may be configured to be divided into a first area and a second area that are different in size from each other based one of the first and second floating diffusion regions being activated, the first area being larger than the second area based on the first floating diffusion region being activated, and the second area being larger than the first area based on the second floating diffusion region being activated.

According to various embodiments, acquiring the first image at operation 1510 may include acquiring the first image based on a signal corresponding to the first area among signals acquired based on the first floating diffusion region being activated, and acquiring the second image at operation 1520 may include acquiring the second image based on a signal corresponding to the second area among signals acquired based on the second floating diffusion region being activated.

According to various embodiments, acquiring the first image at operation 1510 may include acquiring the first image by activating the first floating diffusion region at a first time point, and acquiring the second image at operation 1520 may include acquiring the second image by activating the second floating diffusion region at a second time point following the first time point.

According to various embodiments, the method may further include acquiring a fourth image at operation 1630 based on a signal corresponding to the second area among the signals acquired based on the first floating diffusion region being activated, acquiring a fifth image at operation 1660 based on a signal corresponding to the first area among the signals acquired based on the second floating diffusion region being activated, and generating a sixth image at operation 1680 by synthesizing at least part of the fourth image and at least part of the fifth image, the sixth image having a resolution higher than a resolution of the fourth or fifth image.

According to various embodiments, the method may further include generating a seventh image at operation 1690 by synthesizing the third and sixth images Although the descriptions have been made of the components with specific reference numbers for convenience of explanation, the embodiments are not limited by the components corresponding to the reference numbers.

The invention claimed is:

1. An electronic device comprising:
 an image sensor; and
 a processor,
 wherein the image sensor comprises a micro lens and a light-receiving sensor pixel converting light passed through the micro lens to an electric signal, the light-receiving sensor pixel comprising a first floating diffusion region and a second floating diffusion region, and is configured to divide the light-receiving sensor pixel into a first area and a second area based on one of the first and second floating diffusion regions being activated, the first and second areas being different in size, and read out signals generated by the light-receiving sensor pixel, the signals comprising a first signal corresponding to the first area and a second signal corresponding to the second area; and
 the processor is configured to control the image sensor to activate the first floating diffusion region to acquire a first image of an external object and activate the second floating diffusion region to acquire a second image of the external object and to synthesize at least part of the first image and at least part of the second image to generate a third image having a resolution higher than the resolution of the first image or the second image,
 wherein the image sensor is configured to form the first area and the second area that is smaller than the first area based on the first floating diffusion region being activated and form the first area and the second area that is larger than the first area based on the second floating diffusion region being activated.

2. The electronic device of claim 1, wherein the first and second floating diffusion regions are formed in parallel in a widthwise direction or lengthwise direction of the light-receiving sensor pixel.

3. The electronic device of claim 1, wherein the processor is configured to control to acquire the first image based on a signal corresponding to the first area among signals acquired based on the first floating diffusion region of the image sensor being activated and the second image based on a signal corresponding to the second area among signals acquired based on the second floating diffusion region of the image sensor being activated.

4. The electronic device of claim 3, wherein the processor is configured to acquire the first image by activating the first floating diffusion region at a first time point and the second image by activating the second floating diffusion region at a second time point.

5. The electronic device of claim 4, wherein the first signal output from multiple light-receiving sensor pixels of the image sensor is input to the processor through a first channel, and the second signal output from the multiple light-receiving sensor pixels is input to the processor through a second channel.

6. The electronic device of claim 3, wherein the processor is configured to control to acquire a fourth image based on a signal corresponding to the second area among the signals acquired based on the first floating diffusion region of the image sensor being activated and a fifth image based on a signal corresponding to the first area among the signals acquired based on the second floating diffusion region of the image sensor being activated and generate a sixth image with a resolution higher than a resolution of the fourth or fifth image by synthesizing at least part of the fourth image and at least part of the fifth image.

7. The electronic device of claim 6, wherein the processor is configured to control to generate a seventh image by synthesizing the third and sixth images.

8. The electronic device of claim 1, wherein the light-receiving sensor pixel further comprises a third floating diffusion region and a fourth floating diffusion region formed perpendicularly with respect to the first and second floating diffusion regions.

9. The electronic device of claim 8, wherein the processor is configured to control the image sensor to acquire the first image by activating the first and third floating diffusion regions and the second image by activating the second and third floating diffusion regions.

10. The electronic device of claim 9, wherein the processor is configured to control the image sensor to acquire an eighth image by activating the first and fourth floating diffusion regions and a ninth image by activating the second and fourth floating diffusion regions and generate a tenth image by synthesizing the first, second, eighth, and ninth images.

11. An image up-sampling method of an electronic device, the method comprising:
acquiring a first image of an external object by activating a first floating diffusion region of a light-receiving sensor pixel;
acquiring a second image of the external object by activating a second floating diffusion region of the light-receiving sensor pixel; and
generating a third image by synthesizing at least part of the first image and at least part of the second image, the third image having a resolution higher than a resolution of the first or second images,
wherein the light-receiving sensor pixel is configured to be divided into a first area and a second area that are different in size from each other based on one of the first and second floating diffusion regions being activated, the first area being larger than the second area based on the first floating diffusion region being activated, and the second area being larger than the first area based on the second floating diffusion region being activated.

12. The method of claim 11, wherein acquiring the first image comprises acquiring the first image based on a signal corresponding to the first area among signals acquired based on the first floating diffusion region being activated, and acquiring the second image comprises acquiring the second image based on a signal corresponding to the second area among signals acquired based on the second floating diffusion region being activated.

13. The method of claim 11, wherein acquiring the first image comprises acquiring the first image by activating the first floating diffusion region at a first time point, and acquiring the second image comprises acquiring the second image by activating the second floating diffusion region at a second time point following the first time point.

14. The method of claim 12, further comprising:
acquiring a fourth image based on a signal corresponding to the second area among the signals acquired based on the first floating diffusion region being activated;
acquiring a fifth image based on a signal corresponding to the first area among the signals acquired based on the second floating diffusion region being activated; and
generating a sixth image by synthesizing at least part of the fourth image and at least part of the fifth image, the sixth image having a resolution higher than a resolution of the fourth or fifth image.

15. The method of claim 14, further comprising generating a seventh image by synthesizing the third and sixth images.

* * * * *